J. W. HEARST.
STORAGE BATTERY ATTACHMENT FOR AIRSHIPS.
APPLICATION FILED MAR. 17, 1910.
984,667.
Patented Feb. 21, 1911.
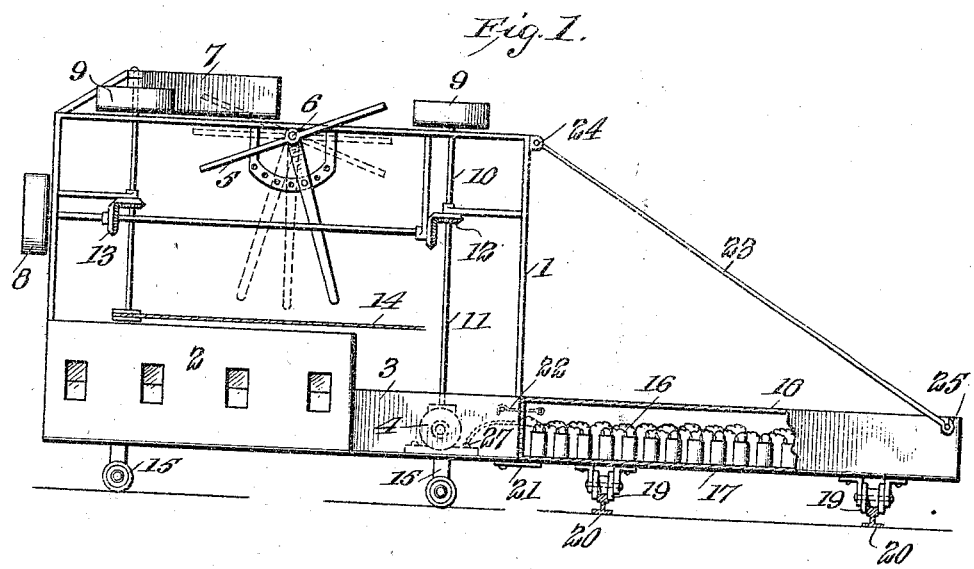
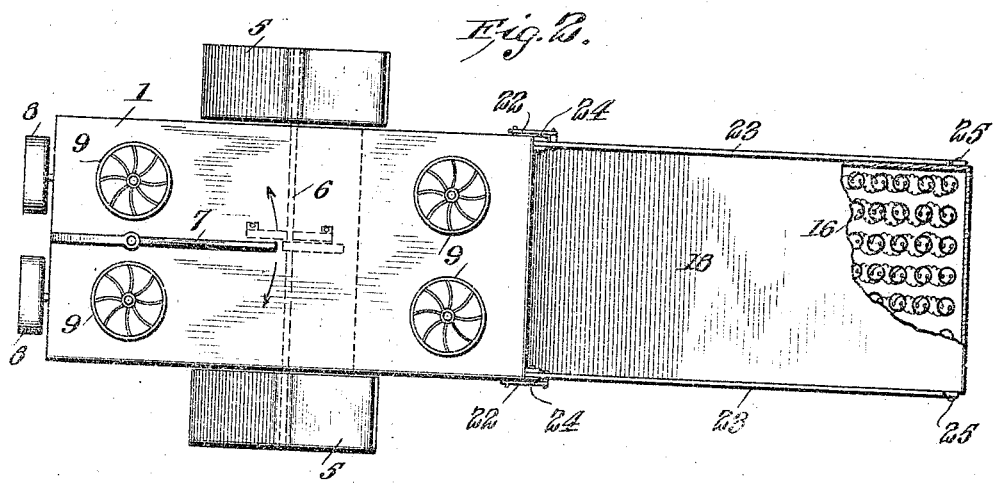

UNITED STATES PATENT OFFICE.

JOHN W. HEARST, OF OAKLAND, CALIFORNIA.

STORAGE-BATTERY ATTACHMENT FOR AIRSHIPS.

984,667.  Specification of Letters Patent. Patented Feb. 21, 1911.

Application filed March 17, 1910. Serial No. 549,887.

*To all whom it may concern:*

Be it known that I, JOHN W. HEARST, a citizen of the United States, residing at Oakland, in the county of Alameda and State of California, have invented certain new and useful Improvements in Storage-Battery Attachments for Airships, of which the following is a specification.

This invention relates to certain new and useful improvements in aerial devices and it has for its objects among others to provide simple and efficient novel means whereby the storage batteries may be readily supplied to the aeroplane and the spent batteries removed and a new lot placed in position at the aerial station. This may be accomplished in a variety of ways, the one that I at the present time consider preferable being herein illustrated, although the invention is not necessarily restricted to such particular construction and arrangement, the invention having as a generic feature the idea of placing the batteries upon a truck or movable object so that the spent batteries may be readily removed from the aeroplane and another lot supplied thereto, regardless of the specific manner in which this is accomplished.

Other objects and advantages of the invention will hereinafter appear and the novel features thereof will be particularly pointed out in the appended claims.

The invention is clearly illustrated in the accompanying drawings, which, with the numerals of reference marked thereon, form a part of this specification, and in which—

Figure 1 is a side elevation with a portion broken away and parts in section. Fig. 2 is a top plan with a portion broken away and parts in section.

Like numerals of reference indicate like parts throughout the different views.

Referring to the drawings, 1 designates the aeroplane which may be of any well known or approved form of construction. The form illustrated comprises, briefly stated, the car 2 for passengers, the portion 3 wherein is located the motor 4, and regulating planes 5 for raising and lowering the aeroplane, these being connected by the cross shaft 6.

7 is the rudder arranged at the top and 8 are propellers at the front.

9 are the propellers at the front and rear at the top carried by vertical shafts 10 operated from the motor 4 by vertical shafts 11 and the various shafts geared by suitable gearing 12, 13, etc., as indicated in Fig. 1.

14 is the steering rope.

By preference, the aeroplane is mounted upon wheels 15 of any suitable nature so that it may be easily moved about when upon the ground, these wheels being caster wheels or, if desired, grooved wheels, to run upon a track.

The motor is run from a plurality of storage batteries 16, as seen in Fig. 1. These are connected up in the ordinary manner and may be of any desired capacity. In the present instance, they are shown as carried by a box or the like 17 having an inclosing top 18 and this box is mounted upon wheels 19 designed to travel upon the tracks 20 at the aerial station or stations, which latter may be any desired distance apart, say five, ten, or one hundred miles, if necessary. The box or truck 17 may be carried by the aeroplane 1 in any suitable manner; in the present instance, I have shown it as supported upon brackets 21 and secured to the body of the aeroplane by suitable means, as hooks 22 upon opposite sides, the upper end of the box or truck being further supported by the inclined rods 23 which are pivoted at 24 to the upper end of the frame of the aeroplane, the other ends being hooked or similarly formed, as shown at 25, and adapted to engage suitable means on the box or truck so that when the truck or box is in position adjacent the aeroplane and the hooks and rods in position, the box or truck is affixed to the aeroplane and moves with it as one and the same. The batteries are connected up with the motor in a well known manner, as indicated at 27 in Fig. 1.

In practice, when the batteries are to be renewed or when first applied, the aeroplane is brought alongside the tracks 20 of an aerial station and the truck run upon said tracks, being supported thereon by its wheels 19, until in proper position with relation to the aeroplane. The end of the box or truck adjacent the aeroplane rests upon the brackets 21, the hooks 22 are engaged with the coöperating means on the truck or box and the hooked ends of the rods 23 are likewise engaged with their coöperating means on the rear end of the truck. The motor is then connected up with the batteries and the device is ready to start on its journey. When arriving at the next station, the truck or box is unfastened, the batteries are disconnected from the motor and the truck or box run along the track at the station out of the way and then a corresponding truck or box with a new lot of batteries run in place on the tracks and then secured in place upon the aeroplane. Thus equipped, the aeroplane starts on its journey until the batteries have to be renewed, when by stopping at another aerial station, the same procedure is followed.

Modifications in details may be resorted to without departing from the spirit of the invention or sacrificing any of its advantages.

What is claimed as new is—

1. In an aerial device, an aeroplane, a wheeled storage battery support supported at one end upon means on said aeroplane, means for detachably connecting the support with the aeroplane at the adjacent end thereof, and additional attaching means for connecting the rear end of said support with the upper end of the aeroplane.

2. In an aerial device, an aeroplane, a bracket secured to the under side thereof, a storage battery support supported at one end upon said bracket, means for detachably connecting the support with the aeroplane adjacent said bracket, and additional inclined attaching means extending from the top of the aeroplane to the rear end of said support.

3. In an aerial device, an aeroplane, a bracket secured to the under side thereof, a storage battery support supported at one end upon said bracket, means for detachably connecting the support with the aeroplane adjacent said bracket, and additional inclined attaching means extending from the top of the aeroplane to the rear end of said support, said support being mounted upon wheels.

4. In an aerial device, an aeroplane, a bracket secured to the under side thereof, a storage battery support supported at one end upon said bracket, means for detachably connecting the support with the aeroplane adjacent said bracket, and additional inclined attaching means extending from the top of the aeroplane to the rear end of said support, said support and aeroplane being mounted upon wheels.

In testimony whereof I affix my signature in presence of two witnesses.

JOHN W. HEARST.

Witnesses:
CHRISTIAN BOOKLIN,
ALBION S. MEILY.